United States Patent
Dewey (10) Patent No.: US 6,453,607 B1
(45) Date of Patent: Sep. 24, 2002

(54) ROOT-LEVEL PLANT WATERING AND FEEDING DEVICE

(75) Inventor: Jon R. Dewey, Etowah, TN (US)

(73) Assignee: Eldridge Helwick, II, Gulfport, MS (US); a part interest ( * ) Notice: Subject to any disclaimer, the term of this patent is extended or adjusted under 35 U.S.C. 154(b) by 0 days.

(21) Appl. No.: 09/650,358

(22) Filed: Aug. 28, 2000

Related U.S. Application Data (63) Continuation-in-part of application No. 09/433,835, filed on Nov. 3, 1999, now abandoned.

(51) Int. Cl.⁷ .............................................. A01G 25/06
(52) U.S. Cl. ...................................................... 47/48.5
(58) Field of Search ............................ 47/48.5, 79, 82

(56) References Cited

U.S. PATENT DOCUMENTS

| | | | | |
|---|---|---|---|---|
| 1,029,107 A | * | 6/1912 | Couls ........................ | 47/48.5 |
| 5,161,327 A | * | 11/1992 | Cambell et al. ............... | 47/82 |
| 5,595,800 A | * | 1/1997 | Menzel ...................... | 428/363 |

FOREIGN PATENT DOCUMENTS

| | | | |
|---|---|---|---|
| EP | 0154971 A2 | * | 9/1985 |
| GB | 2290933 A | * | 1/1996 |
| GB | 2308798 A | * | 7/1997 |
| JP | 9-56274 | * | 3/1997 |
| JP | 11-75583 | * | 3/1999 |

* cited by examiner

Primary Examiner—Peter M. Poon
Assistant Examiner—Jeffrey L. Gellner
(74) Attorney, Agent, or Firm—Kenneth A. Roddy (57) ABSTRACT

A root-level plant watering and feeding device has a hollow annular liquid dispersion member that circumscribes a center opening of sufficient size to completely encircle a buried root system of a plant and an elongate hollow tubular fill tube connected with the dispersion member which has an upper portion extending upwardly therefrom terminating in an open top end. A removable cap encloses the open top end. The dispersion member has an upper and lower row of longitudinally spaced perforations through its side wall that face toward the center opening. The dispersion member is positioned underground in a substantially horizontal plane with its center opening completely encircling the buried root system in radially spaced relation with the fill tube extending upwardly therefrom and its open top end disposed above the ground surface. Liquids and nutrients introduced into the fill tube are disbursed generally equally through the soil with the upper row of holes directing liquid and nutrients toward an upper portion of the root system and the lower row directing liquid and nutrients toward or below a lower portion of the root system. When the fill tube is empty and the cap is removed, the device serves as an aerator conduit to deliver oxygen directly to the soil surrounding the roots.

5 Claims, 7 Drawing Sheets

ROOT-LEVEL PLANT WATERING AND FEEDING DEVICE

CROSS REFERENCE TO RELATED APPLICATION

This application a continuation-in-part of U.S. patent application Ser. No. 09/433,835, filed Nov. 3, 1999 now abandoned.

BACKGROUND OF THE INVENTION

1. Field of the Invention

This invention relates generally to underground plant watering devices, and more particularly to an underground plant watering device that completely encircles and simultaneously delivers water directly both to the upper and lower portion of a plant's roots, and also serves as an aerator conduit to deliver oxygen directly to the soil surrounding the roots.

2. Brief Description of the Prior Art

It has long been known that, with the exception of very wet climates, watering of plants enhances the growth and productivity of flowers and fruits. Fertilizers and nutrients are also commonly mixed with water and delivered through the watering systems. In a conventional garden, water is usually applied with a sprinkler, which wets the entire ground surface area and leaves water droplets on the plant leaves. This watering method results in producing an abundance of healthy weeds and promotes bacteria and fungus growth on the plant leaves. Non-organic chemical fertilizers mixed with water and delivered through a sprinkler or applied over large areas can also contaminate groundwater systems.

Conventional watering wastes vast amounts of water because, first, much of the water evaporates before it gets below the surface of the soil to a depth at which it would be utilized; second, much of the water that reaches below the soil surface is disbursed throughout the soil in all direction and often outside the limited area where it can be absorbed by the root system, and third, large volumes of water delivered to the soil in a brief period of time is wasted because absorption is limited by the size of the root system and much of the water will trickle out of the root area before it can be absorbed.

There are several patents that disclose various plant watering devices that attempt to overcome these problems. Some of these devices deliver water close to the root system below the soil surface, some are designed to limit the outflow of water from the area of the plant's root system, and others are elaborate drip-watering systems built for slow water delivery.

Hartman, U.S. Pat. No. 4,153,380 and Muza et al, U.S. Pat. No. 4,745,706 are examples of single tubular spike-like apertured devices that are driven into the soil near the root system of a plant and through which water and/or water and fertilizer is passed. The single tube systems allow watering near the root area only from a single spot on one side of the roots, as opposed to completely surrounding the roots.

Caldwell, U.S. Pat. No. 3,896,586, and Scharf, Sr., U.S. Pat. No. 4,268,992, disclose devices utilizing bowl shaped water reservoirs that are placed on the top surface of the soil surrounding a plant and have one or more circumferentially spaced apertured tubes that extend into the soil near the root system. These devices utilize watering tubes of a fixed length secured to the reservoir that do not completely surround the roots and may not reach the optimum depth relative to the buried roots. Placing the bowl-shaped reservoirs on the soil surface above the root system is detrimental to optimum air circulation through the soil and may promote bacteria and fungus growth at the trunk of the plant. The open-ended reservoirs are subject to contamination and gathering of particles that could clog the perforations in the watering tubes. Moreover, the open-ended reservoirs allow water evaporation and will attract birds, vermin, and insects, which can destroy the plant.

Caso, U.S. Pat. No. 4,336,666 discloses an enclosed flexible toroid-shaped reservoir having a plurality of circumferentially spaced tubular metering nozzles that extend into the soil, and require perforation by the user prior to use. Although this device overcomes the open-ended reservoir problem, the tubular nozzles are of a fixed length and integral with the reservoir and may not reach the optimum depth relative to the buried roots. Also, the reservoir is placed on the soil surface above the root system which is detrimental to optimum air circulation through the soil and will promote bacteria and fungus growth at the trunk of the plant.

O'Hara, Jr., U.S. Pat. No. 4,843,757 discloses a root ball water device that is placed around the root ball of a tree or shrub harvested from a nursery. The device is formed of a continuous strand of perforated tubing wound into a series of 360° intersecting loops which define a relatively complex contoured truncated shape with a larger diameter loop at the top and one of smaller diameter below the top loop with the series of loops fastened together at strategic points so that the loops are disposed substantially diagonally.

Watkins, U.S. Pat. No. 2,105,800 discloses a flexible subirrigation device utilizing a scrap rubber tire that is buried horizontally in the ground surrounding the root portion of a plant. The tread portion forms the outer periphery and the side walls form the top and bottom walls, and the bead portions which fit the rim may be positioned close together or wide apart to form an annular slot facing toward the roots of the plant. The downward facing side wall is provided with a plurality of perforations and a funnel may be connected into an aperture in the upper facing side wall for introducing water into the tire casing. The tire casing may also be filled with a water absorbent or water retention material prior to its burial.

The Watkins patent issued in 1938 and since that time much has been learned about buried tires. Most States now have regulations prohibiting burial of whole scrap tires in landfills because they tend to trap air and gases and rise to the surface. Also, studies have shown that buried tires can produce toxic chemicals that are leeched into the soil and groundwater. Watkins states that the cotton cords may rot, however, with modern day steel belted tires, the metallic elements may rust and also leech hazardous metallic solutions into the soil and groundwater. These hazardous chemicals and solutions are likely to be absorbed into the groundwater and root system of the plant.

Polko, German Patent 85,478, issued in 1896, discloses an underground root-level plant watering device with an annular water dispersion tube and a tubular fill tube. The annular water dispersion tube is formed of two semicircular tubular rings having what appears to male and female threaded ends connected together. It is not clear how one could threadedly connect both ends since it would not be possible to twist or screw the second ends together after the first ends are connected together.

Yamahachi Chem KK, Japan Patent 57-141227 discloses an underground root-level plant watering device with an annular water dispersion tube and a tubular fill tube. In the English abstract, the device is described as having porous cups formed of polyolefin foam material having a porosity of 30% to 60% wherein the foam cups are charged with water and liquid fertilizer which will gradually ooze out over a long period of time.

Enyeart, U.S. Pat. No. 4,057,933 discloses a system of perforated piping or conduit and apparatus for aerating comminuted matter such as soil wherein warm and/or evaporated moist air, water vapor, or other gases is injected under pressure into the soil to provide moisture proximate that plant nodules of the root system.

The present invention is distinguished over the prior art in general, and the above patents in particular by a root-level plant watering and feeding device having a hollow annular liquid dispersion member that circumscribes a center opening of sufficient size to completely encircle a buried root system of a plant and an elongate hollow tubular fill tube connected with the dispersion member which has an upper portion extending upwardly therefrom terminating in an open top end. A removable cap encloses the open top end. The dispersion member has an upper and lower row of longitudinally spaced perforations through its side wall that face toward the center opening. The dispersion member is positioned underground in a substantially horizontal plane with its center opening completely encircling the buried root system in radially spaced relation with the fill tube extending upwardly therefrom and its open top end disposed above the ground surface. Liquids and nutrients introduced into the fill tube are disbursed generally equally through the soil with the upper row of holes directing liquid and nutrients toward an upper portion of the root system and the lower row directing liquid and nutrients toward or below a lower portion of the root system. When the fill tube is empty and the cap is removed, the device serves as an aerator conduit to deliver oxygen directly to the soil surrounding the roots.

SUMMARY OF THE INVENTION

It is therefore an object of the present invention to provide a plant watering and feeding device that will significantly reduce the amount of water and fertilizer required to effectively water and fertilize a plant or an entire garden.

It is another object of this invention to provide a plant watering and feeding device that will conserve water by eliminating evaporation.

Another object of this invention is to provide a plant watering and feeding device that is placed beneath the soil surface and will not promote bacteria and fungus growth at the trunk of the plant.

Another object of this invention is to provide a plant watering and feeding device that delivers water and water and fertilizer directly to an individual plant's roots where they are absorbed more efficiently.

Another object of this invention is to provide a plant watering and feeding device that may also be used to deliver oxygen directly to the soil surrounding an individual plant's roots in addition to water and fertilizer.

Another object of this invention is to provide a plant watering and feeding device that completely encircles and delivers water and water and fertilizer to an individual plant's roots from every direction in a substantially uniform fashion.

Another object of this invention is to provide a plant watering and feeding device that simultaneously delivers water and water and fertilizer directly to both the upper root system and the lower root system of an individual plant's roots to promote maximum root growth.

Another object of this invention is to provide a plant watering and feeding device that allows the use of milder natural organic fertilizers rather than harsh non-organic chemical fertilizers and substantially reduces the possibility of contaminating groundwater with fertilizer chemicals and pesticides.

Another object of this invention is to provide a plant watering and feeding device that has no exposed water reservoir and will not attract birds, vermin, and insects, which can destroy the plant.

Another object of this invention is to provide a plant watering and feeding device that has no exposed water reservoir that would be subject to contamination and gathering of particles that could clog perforations in the water dispersion tube.

Another object of this invention is to provide a plant watering and feeding device that can be easily and quickly cleaned and its perforations unclogged after use using a water hose.

Another object of this invention is to provide a plant watering and feeding device having a perforated liquid dispersion member that is positioned underground in the soil relative to a plant's root system during the planting operation to promote maximum plant growth and has an easily accessible above-ground fill tube.

Another object of this invention is to provide a plant watering and feeding device having a perforated liquid dispersion member that is configured to facilitate manufacture by an injection molding process.

A further object of this invention is to provide a plant watering and feeding device that is easily and quickly assembled for use and easily and quickly disassembled for cleaning and storage.

A still further object of this invention is to provide a plant watering and feeding device that is simple in construction, inexpensive to manufacture, and is reusable.

Other objects of the invention will become apparent from time to time throughout the specification and claims as hereinafter related.

The above noted objects and other objects of the invention are accomplished by a root-level plant watering and feeding device having a hollow annular liquid dispersion member that circumscribes a center opening of sufficient size to completely encircle a buried root system of a plant and an elongate hollow tubular fill tube connected with the dispersion member which has an upper portion extending upwardly therefrom terminating in an open top end. A removable cap encloses the open top end. The dispersion member has an upper and lower row of longitudinally spaced perforations through its side wall that face toward the center opening. The dispersion member is positioned underground in a substantially horizontal plane with its center opening completely encircling the buried root system in radially spaced relation with the fill tube extending upwardly therefrom and its open top end disposed above the ground surface. Liquids and nutrients introduced into the fill tube are disbursed generally equally through the soil with the upper row of holes directing liquid and nutrients toward an upper portion of the root system and the lower row directing liquid and nutrients toward or below a lower portion of the root system. When the fill tube is empty and the cap is removed, the device serves as an aerator conduit to deliver oxygen directly to the soil surrounding the roots.

DESCRIPTION OF THE PREFERRED EMBODIMENTS

Referring now to the drawings by numerals of reference there is shown in FIGS. 1 through 4, a preferred embodiment of the plant watering and feeding device 10 in accordance with the present invention. The device 10 has a hollow annular liquid dispersion member 11 of quadrilateral cross section that circumscribes a center opening 12 and an elongated hollow tubular fill tube 13 which is connected to the dispersion member and extends upwardly therefrom in a generally vertical direction, preferably at an angle relative to a vertical axis. The dispersion member 11 and fill tube 13 are formed a suitable rigid plastic material.

Figures 3, 4:
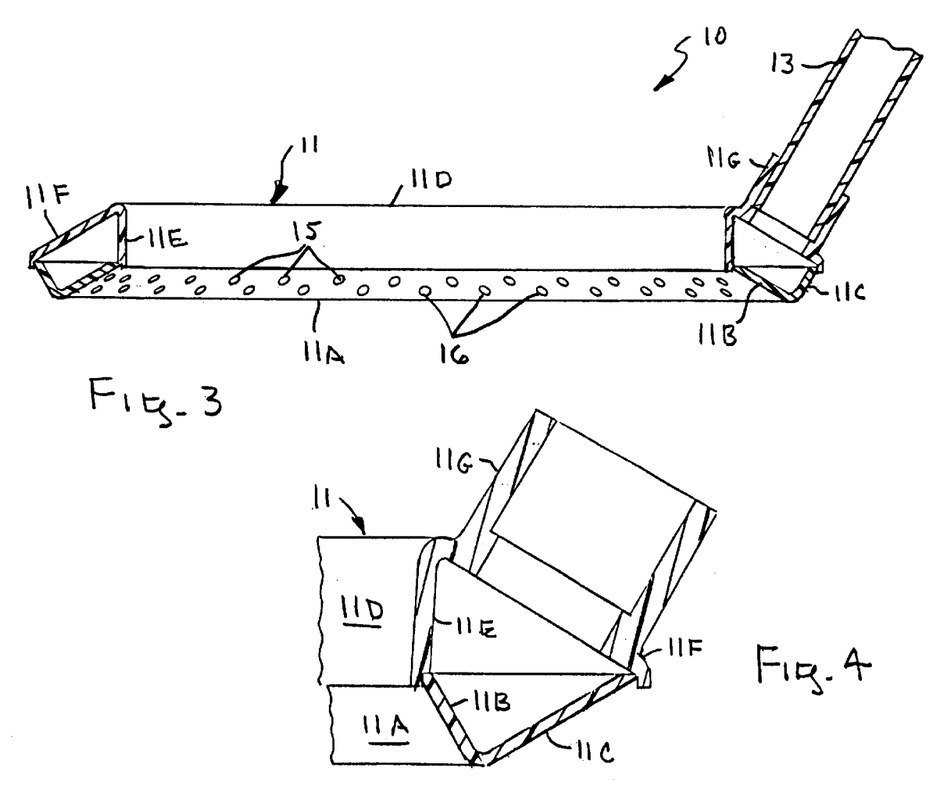
FIG. 3 is a transverse cross section taken along line 3—3 of FIG. 1 showing the quadrilateral configuration of the liquid dispersion member of the plant watering and feeding device.
FIG. 4 is an enlarged transverse cross section through the quadrilateral liquid dispersion member showing the socket connection for the fill tube.

The quadrilateral cross section shape of the dispersion member 11 of the embodiment of FIGS. 1 through 4 facilitates production by an injection molding process, and also positioning of the perforated wall portion. As best seen in FIGS. 3 and 4, in a preferred method of manufacture the quadrilateral liquid dispersion member 11 is formed of a wide generally V-shaped lower member 11A having a pair of flat upwardly diverging walls 11B and 11C and a wide inverted generally V-shaped upper member 11D having a pair of flat downardly diverging walls 11E and 11F.

The upper and lower generally V-shaped members 11A and 11D are formed separately and then secured together in vertically opposed relation by joining the outer ends of the their diverging walls together by sonic welding, bonding, cement, epoxy, or other means conventional in the art. The wide generally V-shapes with diverging walls facilitates release of the components from the injection mold die.

One of the angular walls 11F of the upper member 11D is provided with an upwardly facing tubular socket 11G for removably receiving the lower end of the fill tube 13. A removable lid or cap 14 may also be provided to fit onto the open top end 13A of the fill tube 13 to cover the opening and prevent dirt and other extraneous material from entering into the device.

One of the angular walls 11B of the lower member 11A is provided with an upper row of circumferentially spaced holes 15 and a vertically spaced lower row of circumferentially spaced holes 16 facing the center opening. The angular wall 11B positions the upper row of holes 15 and the lower row of holes 16 to disburse liquids and nutrients in two different planes.

Figures 1, 5:
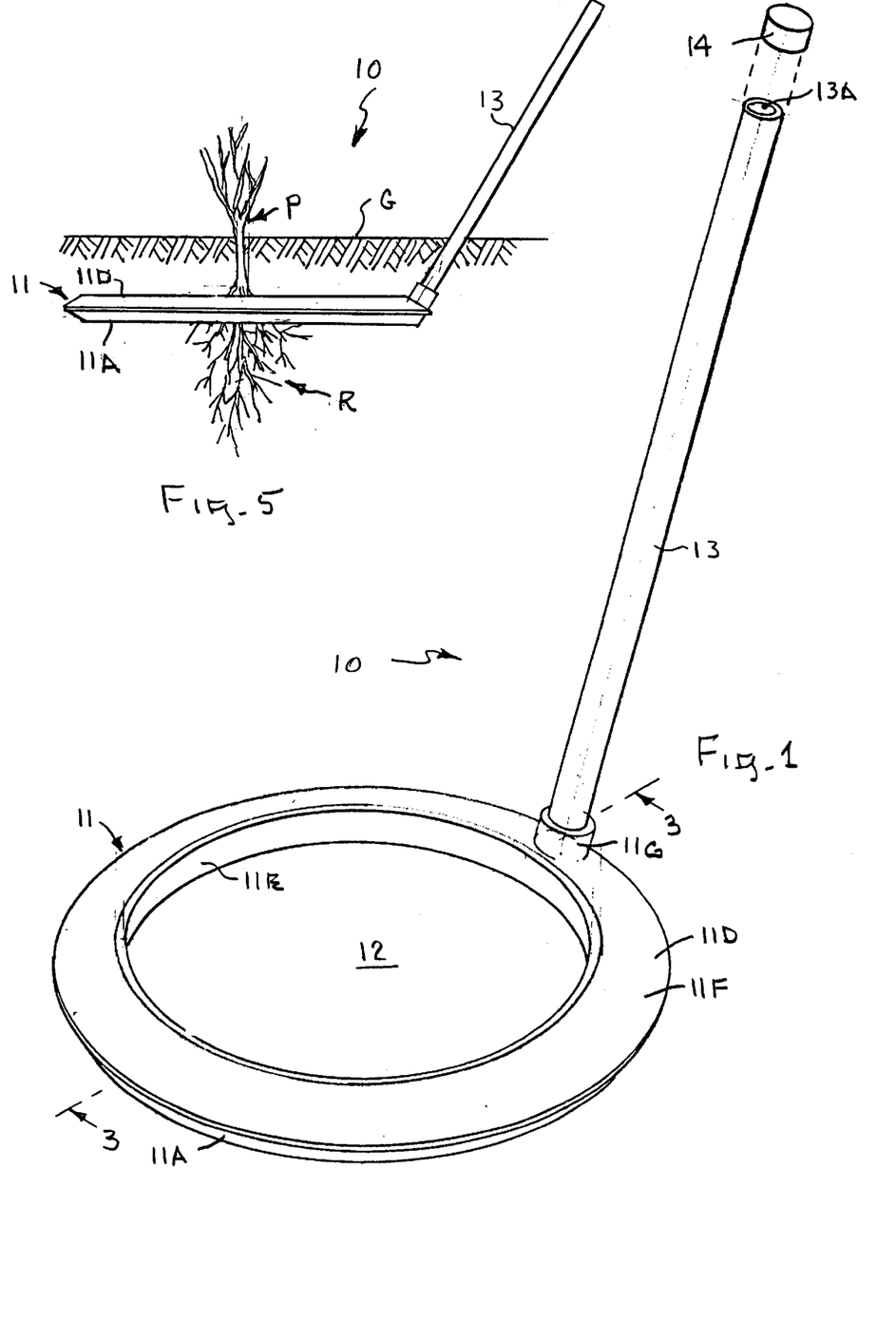
FIG. 1 is a perspective view of a first embodiment of the plant watering and feeding device having an annular liquid dispersion member of quadrilateral cross section in accordance with the present invention shown from the front and top.
FIG. 5 is a side elevation view of the plant watering and feeding device shown buried underground surrounding the root system of a plant.
Figure 2:
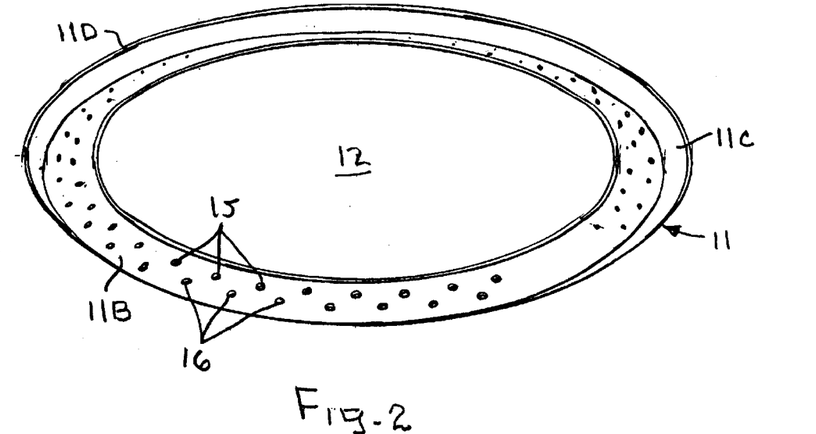
FIG. 2 is a perspective view of the bottom of the liquid dispersion member of the embodiment of FIG. 1.

Referring additionally to FIG. 5, the plant watering and feeding device 10 is installed around the plant P during the planting operation. A hole of sufficient diameter and depth to accommodate the root system R and lower portion of the stem of the plant P is dug in the ground. The plant watering and feeding device 10 is placed into the empty hole with the dispersion member 11 positioned generally horizontal several inches beneath the surface of the ground G. The plant is then lowered down into the hole through the center opening 12 of the dispersion member 11. As in conventional planting techniques, peat moss and/or other materials for facilitating plant growth may also be placed into the hole before or after the plant is lowered into the hole.

When properly positioned, the dispersion member 11 encircles the top of the root system R in radially spaced relation with the spacing therebetween being generally equal along all sides. The upper row of holes 15 should be generally level with the top of the root system R and the lower row of holes 16 should be facing angularly downward toward the lower portion of the root system or below the root system. The hole is then filled in with soil to bury the lower portion of the plant and the dispersion member 11, leaving only the upper portion of the plant and the fill tube 13 extending above the ground surface.

The plant is watered and/or fertilized periodically as required by removing the lid or cap 14 from the fill tube 13 and pouring water or a water and fertilizer mixture into the fill tube until the water level reaches and stays at the top of the fill tube, then replacing the lid or cap. The upper row of holes 15 direct water or water and fertilizer into the soil toward the upper portion of the root system from all directions. The lower row of holes 16 direct water or water and fertilizer into the soil toward the lower portion of the root system or below the root system to saturate the soil beneath the root system and facilitate extended downward growth of the root system.

Thus, the plant watering device 10 completely encircles and delivers water or water and fertilizer simultaneously to both the upper and lower portions of the root system from every direction in a substantially uniform fashion to promote maximum root growth.

When the lid or cap 14 is in place, it significantly reduces water evaporation so that more of it is absorbed into the soil and assimilated by the root system. It also prevents water contamination and gathering of particles that could clog perforations in the dispersion member. Unlike prior art watering devices having an open water reservoir, the capped fill tube of the present invention will not attract birds, vermin, and insects, which can destroy the plant.

The outer top surface of the lid or cap 14 also provides a handy surface where indicia related to the particular plant may be applied by a suitable marker or label, such as plant variety, color, date planted or watered, etc.

When the fill tube 13 is empty, the lid or cap 14 may be removed, so that the dispersion member 11 and fill tube 13 serve as an aerator conduit to deliver oxygen directly to the soil surrounding the roots.

After use, the device can be easily cleaned and reused. A common garden hose may be used to unclog any perforations that may be plugged by placing the end of the hose or the hose nozzle into the open top end 13A of the fill tube 13 and using the water pressure to flush out the interior and discharge any matter that may be plugging the perforations.

It should be understood that the depth of the plant's root system and dispersion member 11 beneath the ground surface will vary depending upon the particular type of plant being planted and fill tubes of different length may be provided. However, a fill tube 13 having a length of approximately 12" to 16" will accommodate most common plant variety requirements.

It should also be understood that the tubular dispersion member 11 and fill tube 13 may be provided in various sizes and shapes for various varieties of plants. The number and size of the perforations may also be correlated to the size of the dispersion member 11. For example, in the case of tomato plants, a dispersion member having a center opening of about 5½" and a side wall having 67 holes of 3/32" diameter has proven to produce very satisfactory results. In most cases the diameter of the perforations should not be smaller than about 1/16" in order to prevent clogging.

Preliminary tests have shown that water and fertilizer amounts are reduced significantly. Water consumption may be as low as only 5%–10% of what is normally used in conventional gardening. The exact amounts may vary taking into consideration natural rain and soil conditions. It has also been found that fertilizer requirements may be as low as 15%–20% of what is normally used with conventional watering and feeding systems, while increasing crop yield up to 20 times on such plants as tomatoes.

The dispersion member 11 is packaged along with the fill tube 13 disconnected from the socket 11G to facilitate compact packaging and storage. Thus, prior to use, the user merely needs to press the open bottom end of the fill tube 13 into the open end of the socket 11G.

The dispersion member may also be made in various other configurations that will encircle the root system of a plant. In the following descriptions the fill tube 13 and other features previously shown and described are assigned the same numerals of reference, but their description will not repeated in detail to avoid repetition.

Figure 6:
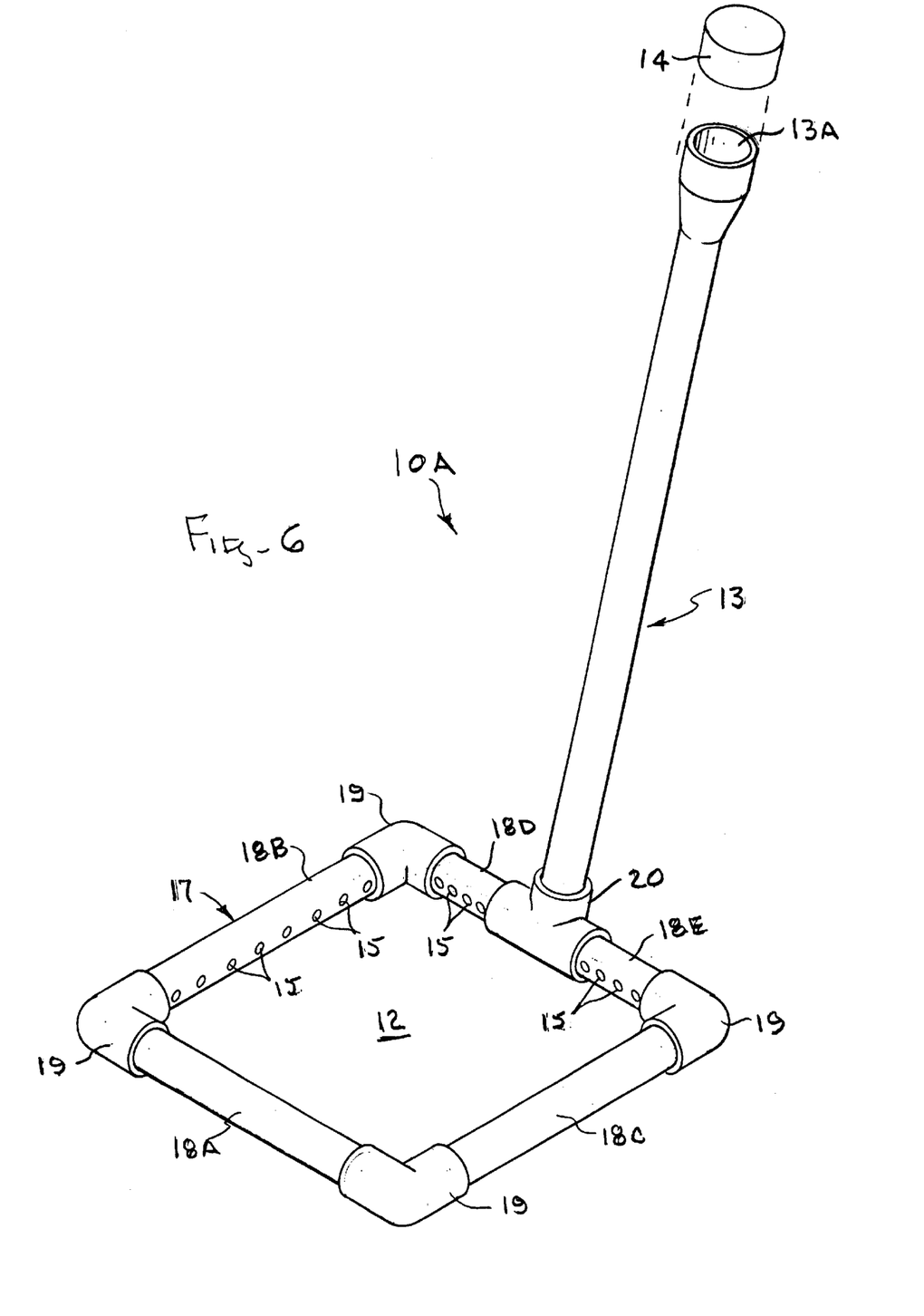
FIG. 6 is a perspective view of an embodiment of the plant watering and feeding device having a four-sided liquid dispersion member formed of tubing and ell members, shown from the front and top.
Figures 7, 8:
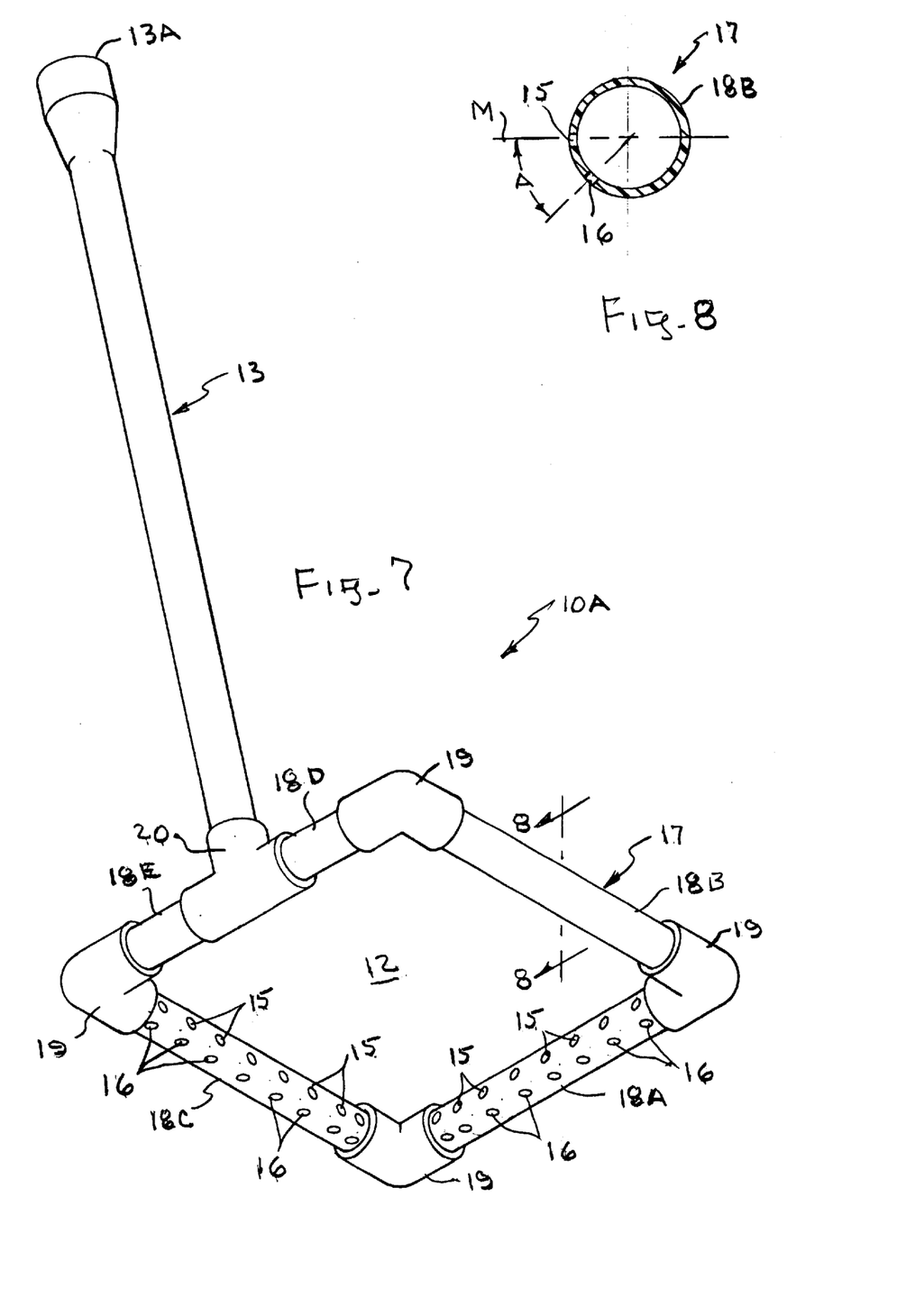
FIG. 7 is a perspective view of the embodiment of FIG. 6 shown from the rear and bottom.
FIG. 8 is a transverse cross section taken along line 8—8 of FIG. 7 showing the upper and lower holes through the tubular dispersion member of the plant watering and feeding device.

FIGS. 6 and 7 show a plant watering and feeding device 10A having a four-sided tubular liquid dispersion member 17 formed of PVC tubing. Three longer segments of perforated straight tubing 18A–18C joined at their ends by 90° ells 19 form three sides of the dispersion tube 17. The fourth side of the dispersion tube 17 is formed by two laterally opposed shorter segments of perforated tubing 18D and 18E joined together at their opposed facing ends by a tee fitting 20 and joined at their outer ends to two of the opposed ells 19 on the lateral sides of the dispersion tube.

The inward facing side of each of the tubular dispersion tube segments 18A–18E are provided with an upper row of longitudinally spaced holes 15 and a lower row of longitudinally spaced holes 16. As best seen in transverse cross section in FIG. 8, the upper row of holes 15 are positioned along the mid section M of the cylindrical side wall of each segment and the lower row of holes 16 are circumferentially spaced below the mid section of the tubular segment at an angle A.

Referring again to FIGS. 6 and 7, the open top end 13A of the elongate fill tube 13 may be a funnel-shaped conical configuration. The funnel-shaped top end 13A of the fill tube 13 facilitates pouring water or water and fertilizer into the fill tube from a container or using a garden hose to supply water. A removable lid or cap 14 may also be provided to fit onto the open top end 13A of the fill tube 13 to cover the opening and prevent dirt and other extraneous material from entering into the device. It should be understood that the embodiment of FIGS. 1 and 2 described previously may also utilize a fill tube having a funnel-shaped top end.

The advantage of the polygonal or four-sided plant watering and feeding device of FIGS. 6 and 7 is that various lengths of the dispersion tube segments may be provided to form a center opening of sufficient size to encompass the root system of a plurality of plants or a row of plants.

Figure 9:
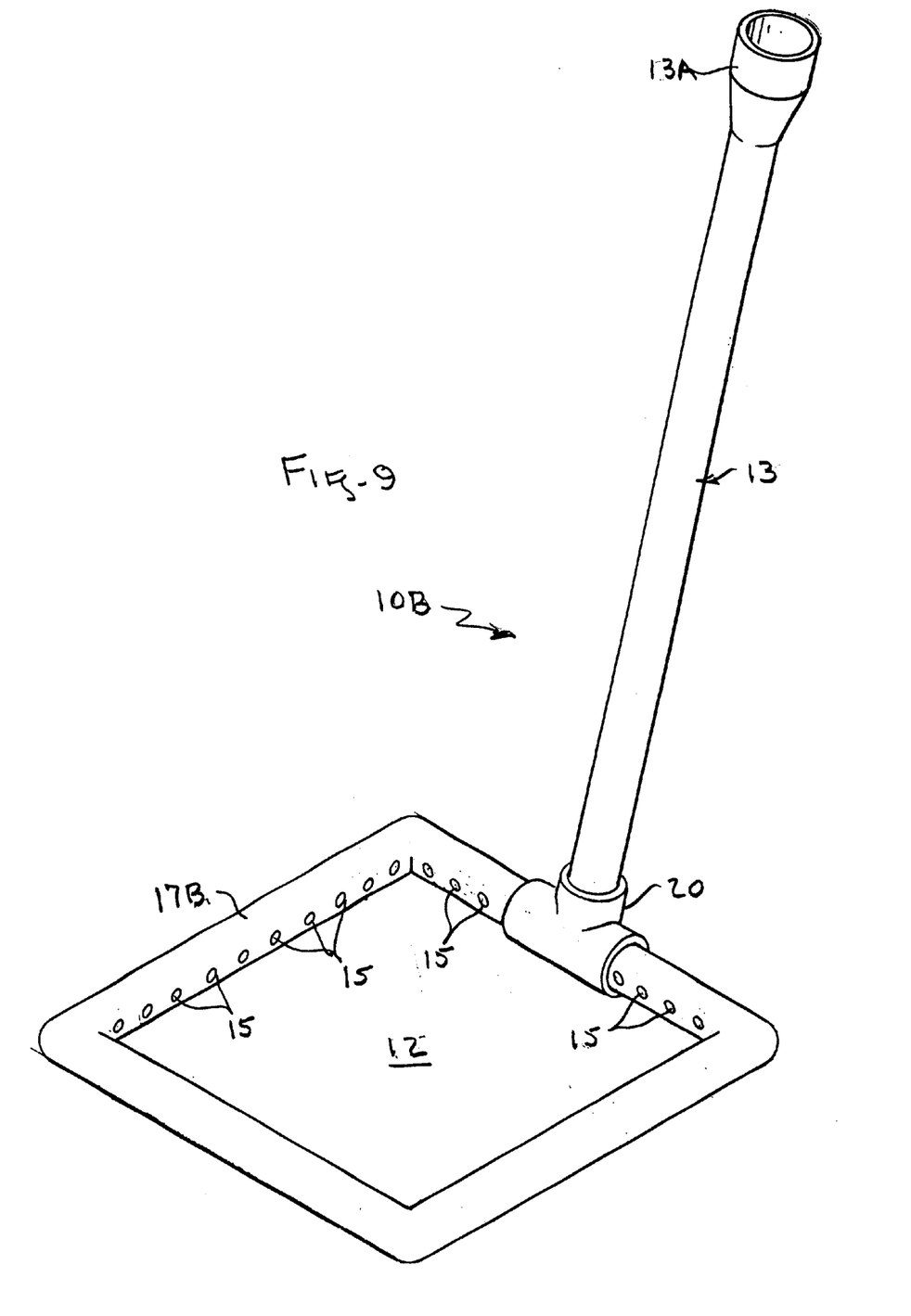
FIG. 9 is a perspective view of an embodiment of the plant watering and feeding device having a unitary four-sided tubular liquid dispersion member with a tee for receiving the fill tube.

FIG. 9 shows an embodiment the plant watering and feeding device 10B with a unitary four-sided dispersion tube 17B having opposed facing open ends connected by the lateral ends of the tee 20 with the bottom end of the fill tube 13 connected in the open end of the tee.

Figure 10:
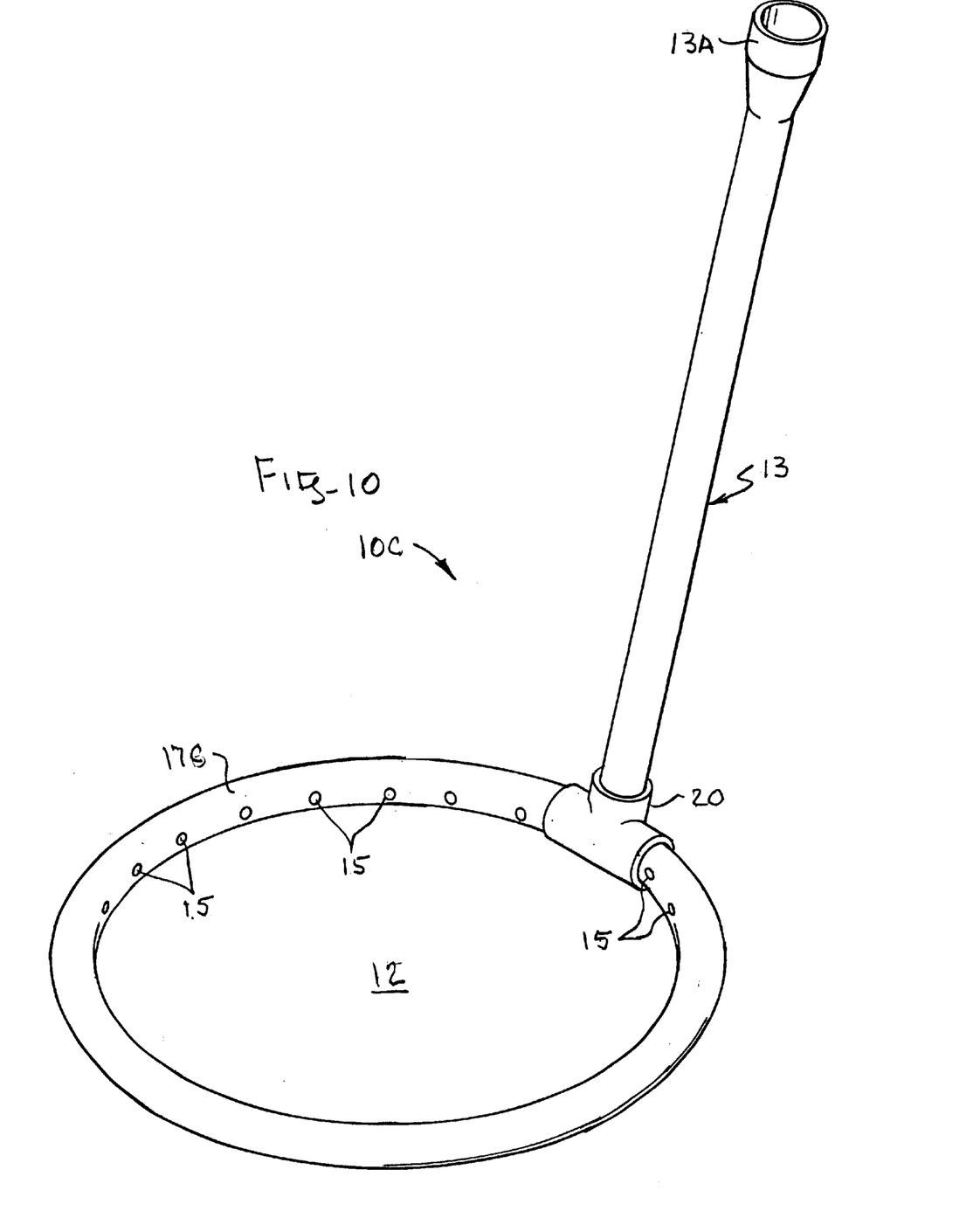
FIG. 10 is a perspective view of an embodiment of the plant watering and feeding device having a circular toroid-shaped tubular liquid dispersion member connected to the fill tube by a tee.

FIG. 10 shows an embodiment of the plant watering and feeding device 10C with a circular toroid-shaped dispersion tube 17C having opposed facing open ends connected by the lateral ends of the tee 20 with the bottom end of the fill tube 13 connected in the open end of the tee.

In the embodiments described above that utilize a tee 20, the lateral ends of the tee may be rotatably connected with the tubular segments 18D,18E, the dispersion tube 17B or the opposed ends of the circular toriod-shaped dispersion tube 17C so that its upward facing end may be pivoted relative to the dispersion tube. This will allow the fill tube 13, when connected therein, to be selectively positioned along a vertical axis or at selective angles relative to a vertical axis.

In this modification, the lateral ends of the tee 20 are frictionally engaged on the opposed facing ends of the dispersion tube segments or dispersion tube with a friction fit sufficient to allow it to be manually pivoted relative thereto with sufficient force and to remain in the pivoted position. The upper portion of a plant may be tied to the fill tube 13 when placed in a vertical position.

Figure 11:
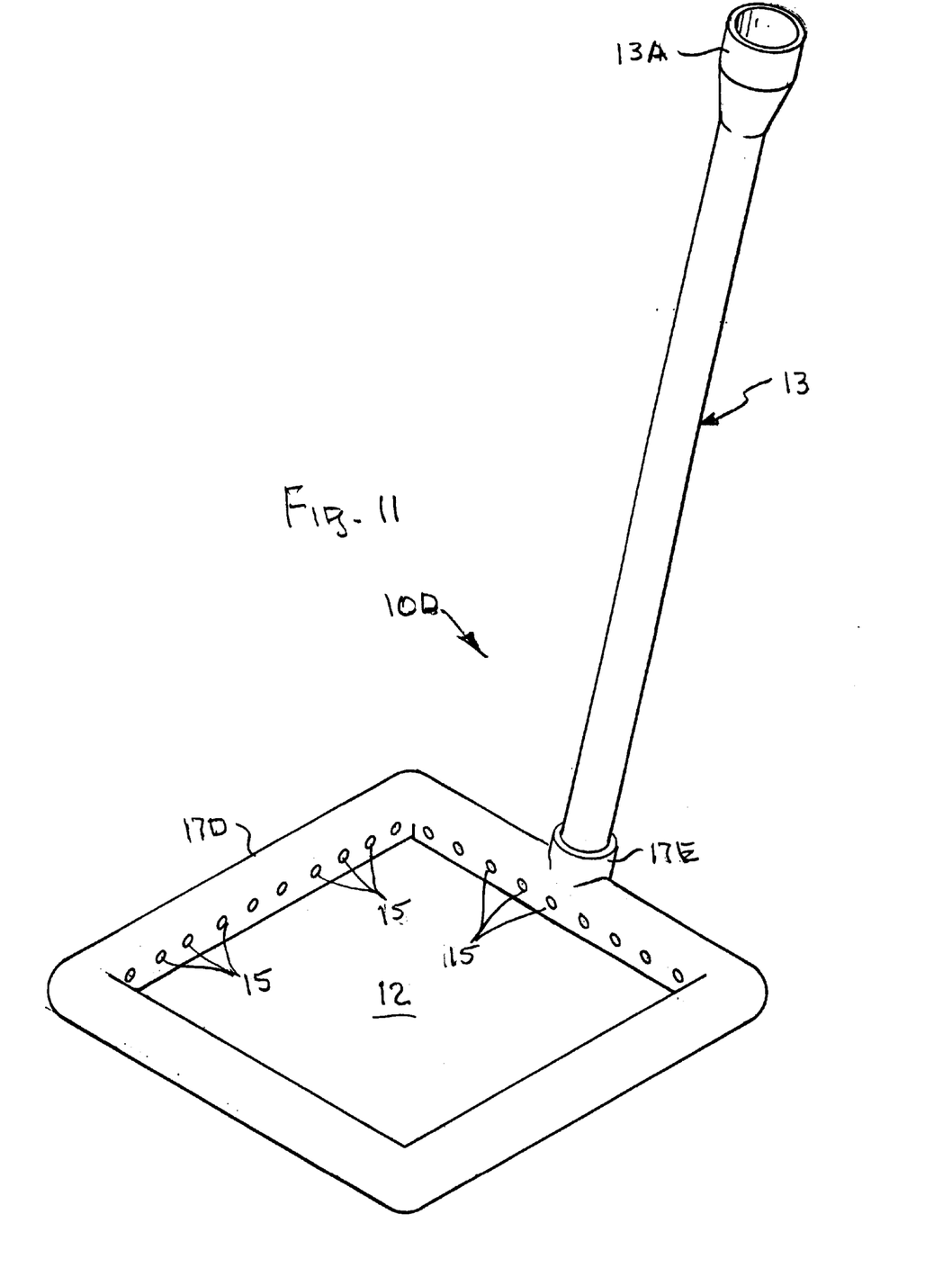
FIG. 11 is a perspective view of an embodiment of the plant watering and feeding device having a unitary tubular liquid dispersion member with an integral neck portion in which the fill tube is connected.

FIG. 11 shows an embodiment of the plant watering and feeding device 10D having a unitary four-sided dispersion tube 17D with an integral neck or socket portion 17E in which the bottom end of the fill tube 13 is connected.

The above-described embodiments having a unitary four-sided or circular tubular liquid dispensing member may also preferably manufactured by an injection molding process. In this process, the tubular dispersion member is formed by an upper member and a lower member having a four-sided or circular shape with a semicircular transverse cross section. The upper and lower members are formed separately and then secured together in vertically opposed relation by sonic welding, bonding, cement, epoxy, or other means conventional in the art. The semicircular cross sectional shapes facilitate release of the components from the injection mold die.

The plant watering and feeding device in accordance with the present invention may be complemented with an automatic watering system in large-scale gardening environments. Ground moisture sensors may also be integrated with the system in order to optimize the growing process. It should also be understood that the device may be used in growing a variety of plants, including fruits, vegetables, and flowers, and in growing plants from seed, tubers, or bulbs.

Because of its efficiency in delivering water, water and fertilizer, and air directly to both the upper root system and the lower root system of an individual plant's roots, less fertilizer is required and the device allows the use of milder natural organic fertilizers rather than harsh non-organic chemical fertilizers. Thus, the present device will substantially reduce the possibility of contaminating groundwater with fertilizer chemicals and pesticides.

While this invention has been described fully and completely with special emphasis upon a preferred embodiment, it should be understood that within the scope of the appended claims the invention may be practiced otherwise than as specifically described herein.

What is claimed is:

1. An underground root-level plant watering and feeding device comprising:

a rigid hollow annular liquid dispersion member of quadrilateral transverse cross section circumscribing a center opening of sufficient size to completely encircle a buried root system of a plant in radially spaced relation;

said hollow quadrilateral liquid dispersion member having a first pair of flat angular walls defining a wide generally V-shaped lower portion and a second pair of angular walls defining a wide inverted generally V-shaped upper portion, one of said upper portion angular walls having an upwardly facing tubular socket in fluid communication with the interior of said liquid dispersion member;

an elongate hollow tubular fill tube having a lower end releasably connected in said socket in fluid communication with the interior of said liquid dispersion member and an upper portion extending upwardly therefrom terminating in an open top end; and a plurality of circumferentially spaced holes extending through a side wall of said liquid dispersion member facing toward said central opening;

said liquid dispersion member being positioned underground in a substantially horizontal plane with its central opening completely encircling and its said perforations facing the buried root system of a plant in radially spaced relation with said elongate hollow tubular fill tube extending upwardly from said liquid dispersion member and its said open top end disposed above the ground surface; whereby liquids and nutrients introduced into said fill tube flow outwardly from said holes and are disbursed generally equally through the soil in a direction toward said root system.

2. The underground root-level plant watering and feeding device according to claim 1, wherein said lower portion and said upper portion are formed separately by injection molding and secured together in vertically opposed relation.

3. The underground root-level plant watering and feeding device according to claim 1, wherein said plurality of circumferentially spaced holes comprise an upper row of circumferentially spaced holes and a vertically spaced lower row of circumferentially spaced holes extending through one of said lower portion angular walls facing the encircled buried root system of the plant; and said upper row of holes positioned to direct liquid and nutrients toward an upper portion of said root system and said lower row of holes positioned to direct said liquid and nutrients in a direction toward or below a lower portion of said root system.

4. The underground root-level plant watering and feeding device according to claim 1, further comprising a removable cap adapted to removably engage and enclose said fill tube open end.

5. The underground root-level plant watering and feeding device according to claim 1, wherein said elongate hollow tubular fill tube open top end is an upward and radially outward flared funnel configuration.

* * * * *